United States Patent [19]

Deierlein

[11] Patent Number: 4,937,722
[45] Date of Patent: Jun. 26, 1990

[54] HIGH EFFICIENCY DIRECT COUPLED SWITCHED MODE POWER SUPPLY

[75] Inventor: Peter O. Deierlein, E. Syracuse, N.Y.

[73] Assignee: North American Philips Corporation, New York, N.Y.

[21] Appl. No.: 352,655

[22] Filed: May 12, 1989

Related U.S. Application Data

[63] Continuation of Ser. No. 235,263, Aug. 23, 1988, abandoned.

[51] Int. Cl.$^5$ ............................................. H02M 7/21
[52] U.S. Cl. ...................................... 363/49; 323/285; 323/290; 363/80; 363/89
[58] Field of Search ............................ 363/45, 47–49, 363/53, 80, 81, 89; 323/285, 290, 351

[56] References Cited

U.S. PATENT DOCUMENTS

| | | | |
|---|---|---|---|
| 3,340,458 | 9/1967 | Keller | 363/48 |
| 3,798,531 | 4/1974 | Allington | 363/89 |
| 3,806,791 | 4/1974 | Johnson | 363/48 |
| 4,195,333 | 3/1980 | Hedel | 363/21 |
| 4,396,882 | 8/1983 | Kellenbenz | 323/278 |
| 4,555,741 | 11/1985 | Mosaki | 361/58 |
| 4,607,210 | 8/1986 | Ohms et al. | 323/290 |
| 4,634,903 | 1/1987 | Montorfano | 307/571 |
| 4,667,281 | 5/1987 | Lindquist et al. | 363/89 |
| 4,713,742 | 12/1987 | Parsley | 363/124 |
| 4,717,994 | 1/1988 | Diaz et al. | 363/56 |
| 4,719,553 | 1/1988 | Hinckley | 363/49 |
| 4,791,544 | 12/1988 | Gautherin et al. | 363/49 |

FOREIGN PATENT DOCUMENTS

| | | | |
|---|---|---|---|
| 8325 | 1/1983 | Japan | 363/49 |
| 1108413 | 8/1984 | U.S.S.R. | 323/290 |
| 1574805 | 9/1980 | United Kingdom | 363/45 |

OTHER PUBLICATIONS

IBM Technical Discl. Bull., vol. 25, No. 2, Jul. 1982, p. 470.

Primary Examiner—William H. Beha, Jr.
Attorney, Agent, or Firm—Michael E. Marion

[57] ABSTRACT

A direct coupled switched mode power supply designed for the AC to DC power conversion in for example CAT TV systems and equipment. The power supply is constructed to have a conversion efficiency of between 85 and 90%. It achieves these efficiencies by utilizing a pulse transformer having a duty cycle of greater than 50% in conjunction with an output control circuit, a driver circuit and an output filter circuit all designed to work together to effect increased efficiency.

3 Claims, 3 Drawing Sheets

HIGH EFFICIENCY DIRECT COUPLED SWITCHED MODE POWER SUPPLY

This is a continuation of application Ser. No. 235,263, filed Aug. 23, 1988, now abandoned.

FIELD OF THE INVENTION

The invention relates to a high efficiency switched mode power supply (SMPS) of the type designed for AC to DC power conversion as used for example in CATV systems.

BACKGROUND OF THE INVENTION

Switched mode power supplies are widely used in industry for example in amplifiers used in CATV systems. Such amplifiers are required to perform under extreme environmental conditions such as power brown-outs, over voltage and lightening storms which can cause short term power interruption. The design of a power supply which can operate successfully under these conditions and at the same time be more efficient in its conversion of AC to DC would be most desirable by industries such as the cable television industry.

DESCRIPTION OF THE PRIOR ART

Switched mode power supplies are well known in the art, see for example U.S. Pat. No. 3,798,531 and SIGNETICS application note AN120, p. 8-62 to 8-67, "1987 LINEAR DATA MANUAL Volume 2 : Industrial", Signetics Corporation. AC voltage is converted to a regulated DC voltage in an SMPS by first rectifying the AC into an unregulated DC, then "chopping" the unregulated DC using an electronic switch, i.e. a transistor, which is controlled by a switching signal. The "chopped" DC is then filtered and provides the regulated DC output. Regulation is provided by a control circuit which applies the switching signal via a driver circuit to the switch.

The control circuit can be an integrated circuit such as the pulse width modulator (PWM) controller, Unitrode No. UC2842N. This circuit compares the unregulated DC with the DC output and modifies the duty cycle of the switching signal to keep the DC output voltage constant irrespective of load and line voltage changes.

Switched mode power supplies have heretofore approached efficiencies from about 70 to 82%. Although these supplies can use single ended driver circuits capable of high duty cycles, these circuits have avoided the use of pulse transformers at duty cycles over 50%, due to stability problems. In addition, these power supply designs which used only a thermistor as an in-rush surge limiter did not function properly during short power interruptions such as those caused by lightening or power brown-outs.

It is therefore an object of the instant invention to provide a switched mode power supply which demonstrates a higher conversion efficiency than that previously available resulting in lower power costs and higher profits for the industrial user.

It is a further object of the instant invention to provide a power supply with superior performance in the face of over voltage and short power interruptions such as those caused by electrical storms and power brown-outs.

SUMMARY OF THE INVENTION

The instant invention provides a switched mode power supply which provides AC to DC conversion efficiency of from about 85% to about 90%. As used in trunk amplifiers in the cable television (CATV) industry this could translate into a reduction in power costs by up to 30% over power supplies currently available.

One embodiment of the instant invention comprises an input control means, a driver means, and an output filter means comprising a bifilar wound inductor not previously used in switched mode power supplies.

The input control means comprises a surge limiting resistor which limits current flow during initial power application and this resistor is shunted by a sensitive relay during normal operation which reduces power dissipation thereby increasing efficiency. The resistor can be a negative temperature coefficient thermistor having a resistance which drops to reduce dissipation in the event of the failure of the relay. The input control means also comprises a bleeder resistor which is disconnected by the relay during normal operation of the supply also reducing power dissipation and increasing efficiency. A third resistor and a diode which supplies start-up power to the current mode PWM controller IC can also be disconnected by the relay during normal operation of the supply.

The driver means can comprise a driver circuit with a pulse transformer which provides isolation and very high switching rates at pulse duty cycles from 0 to over about 95% with excellent stability and very low power dissipation. The transformer features a low leakage inductance and a high saturation flux density and provides stable operation over a wide duty cycle range which is required for applications such as CATV power supplies which must function over a five-to-one input voltage range.

The output filter means uses an inductor which is bifilar wound. The two windings are connected in parallel to minimize DC resistance and to maximize efficiency. Although this goal could be achieved using a single winding of heavier wire, a larger toroid core would be required resulting in a higher cost of winding. In addition, the bifilar winding method reduces interwinding capacitance which simplifies the design of the output filter.

DETAILED DESCRIPTION OF THE INVENTION

The instant invention is a high efficiency switched mode power supply of the type generally used under conditions requiring a maximum power conversion efficiency together with maximum tolerance for short term power interruption and stability under the most rugged conditions.

Figure 1:
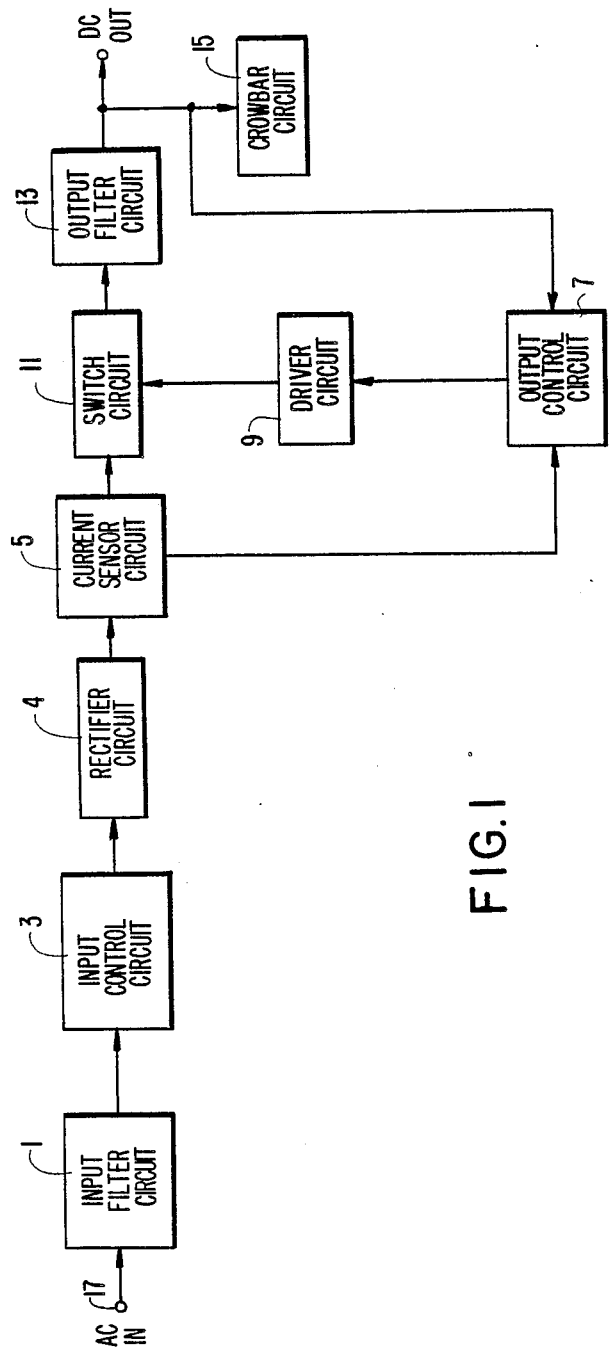
FIG. 1 describes a block diagram of one embodiment of the instant invention.

FIG. 1 is a block diagram of an embodiment of the instant invention and describes a high efficiency AC to DC switched mode power supply with a high frequency switching rate, for example 24 kilohertz, and superior tolerance for operation under severe AC line surge and transient and overload conditions across a wide temperature range. Such a supply would be ideal for use in a CATV amplifier, for example.

AC power (for example 40 to 60 volts rms) is applied to the power supply through a fused input and passes through an input filter circuit 1 which prevents line transients from entering the power supply and prevents switching noise from leaking from the power supply into the system line. AC then passes to the input control circuit 3 which operates as described below to reduce power dissipation and increase efficiency of the power supply as described below. AC passes from the input control circuit 3 to the rectifier circuit 4 which rectifies the AC to unregulated DC. The unregulated DC is then applied to current sensor circuit 5 which sends a voltage to the output control circuit 7 which is proportional to the current flowing through current sensor circuit 5. The output control circuit 7 acts to keep the DC output of the power supply constant irrespective of load and line voltage variations, as described in more detail below.

The output control circuit 7 monitors and compares the voltage sent from the current sensor circuit 5 and the DC output voltage provided by output filter circuit 13 and provides switching pulses through driver circuit 9 to switch circuit 11 thereby controlling the flow of DC to the output filter circuit 13. The duty cycle of these pulses is inversely proportional to the difference between the DC output voltage provided by output filter circuit 13 and the unregulated DC at the output of rectifier circuit 4. The resulting high voltage pulse waveform output from switch circuit 11 is converted to a low ripple DC by output filter circuit 13 which also prevents switching noise from reaching the output of the supply.

The output filter circuit 13 can comprise a bifilar wound inductor, as described further below.

The power supply can also include crowbar circuit 15 protecting it against damage by clamping the output to ground if it exceeds a particular voltage.

Figure 2:
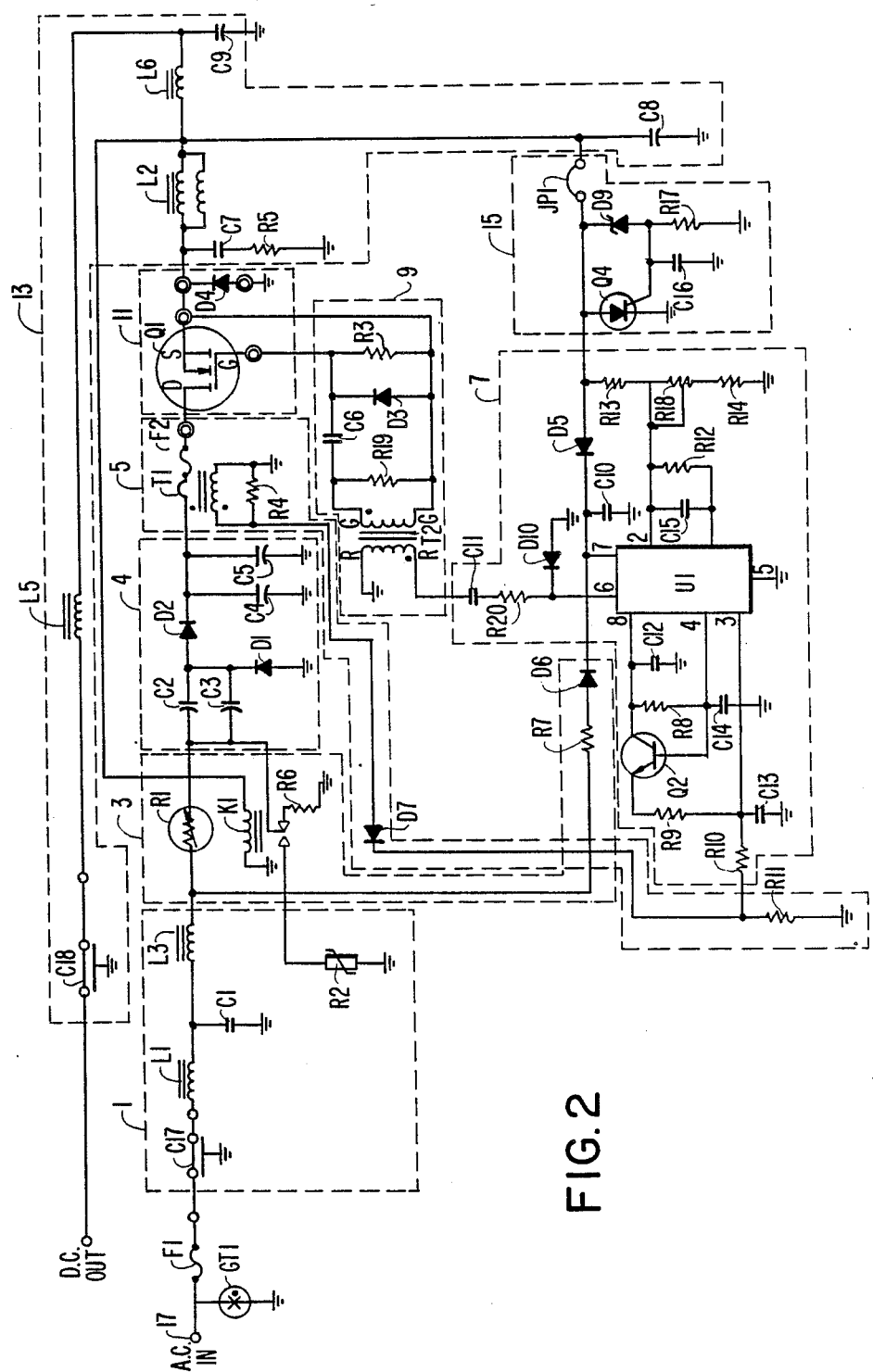
FIG. 2 describes a schematic diagram of the embodiment described in FIG. 1.

FIG. 2 is a schematic diagram of one embodiment of the instant invention which can exhibit a conversion efficiency of up to about 90%. AC is input at input terminal 17. Gas tube GT1 is an optional gas discharge tube which may be used for additional protection in severe surge environments. Gas tube GT1 and fuse F1 can be placed on a separate board to enable the user to access them since the main board must be well shielded against RFI on the main chassis. AC passes through fuse F1 into input filter circuit 1.

Input filter circuit 1 is comprised of varistor R2 and capacitors C1 and C17 and inductors L1 and L3 which filter the AC and substantially reduce RF noise from the input 17. The filtered AC passes from inductor L3 to the input control circuit 3 which comprises thermistor R1, which limits the in-rush surge current during initial power up; relay K1 which disconnects thermistor R1 during normal supply operation for maximum efficiency; and resistor R6 which is also disconnected by relay K1 during normal operation of the supply and which serves to discharge large electrolytic capacitors C2 and C3 of the rectifier circuit 4, if the circuit is interrupted while the AC power is still applied at the input.

Current travels from thermistor R1 of the input control circuit 3 to the rectifier circuit 4, which can be an AC/DC voltage doubler circuit comprised of C2, C3, C4, C5, D1 and D2 which converts the input AC voltage to filtered, unregulated DC voltage which is approximately equal to the peak-to-peak voltage of the AC.

Current flows from rectifier circuit 4 to current sensor circuit 5 which comprises a low loss current transformer T1 which provides isolation between the high voltage unregulated DC coming from the rectifier circuit 4 and the sensitive control circuitry of output control circuit 7. Current sensor circuit 5 also comprises diode D7 which rectifies current from the output of transformer T1 which is converted to a voltage by resistor R11. Resistor R4 terminates transformer T1 in order to prevent core saturation. In the event of a malfunction in control circuitry fuse F2 prevents severe damage to the unit due to the potentially high discharge current from C4 and C5.

Output control circuit 7 comprises a current mode pulse width modulator (PWM) controller integrated circuit (U1). In this embodiment an integrated circuit manufactured by Unitrode, No. UC2842N, is used. U1 is a state of the art integrated circuit which incorporates a precision voltage reference, a high gain error voltage amplifier, a current sense comparator, a system clock, a pulse width modulator, an undervoltage shut-down circuit, and a high current driver circuit all in an eight pin package. Operation of integrated circuit U1 is described fully in a specification sheet published February, 1986 by the Unitrode Corporation, Lexington, Mass. 02173, incorporated herein by reference. Output control circuit 7 also comprises resistor R10 and capacitor C13 which filter the voltage supplied by resistor R11 of current sensor circuit 5; resistor R8 and capacitor C14 which set a high clock frequency, for example 24 khz.; resistor R9 and transistor Q2 which provide "slope compensation" which appears as a voltage across resistor R10 in order to stabilize operation of output control circuit 7 during pulse duty cycles greater than 50%; and resistor R12 and capacitor C15 which limit the gain and frequency response of the integrated circuit U1 error amplifier. Resistors R13, R14 and R18, also comprised by output control circuit 7, form an adjustable voltage divider which lowers voltage output from output filter circuit 13 to a value compatible with the internal reference of integrated circuit U1. C10 and C12 of output control circuit 7 filter the main supply voltage and the reference voltage and R7 and D6 of output control circuit 7 supply initial start up power to integrated circuit U1. Output control circuit 7 also comprises diode D5 which supplies current to integrated circuit U1 from the DC output of the power supply during normal operation; resistor R20 which prevents peak output current from integrated circuit U1 from exceeding one amp; Schottky diode D10 which keeps negative transients from affecting integrated circuit U1; and capacitor C11 which keeps the non-symmetrical unipolar output of integrated circuit U1 from saturating pulse transformer T2 of driver circuit 9.

Driver circuit 9 receives pulses from the output control circuit 7 and comprises in addition to pulse transformer T2, resistor R19 which terminates the secondary of transformer T2 preventing core saturation; capacitor C6 and diode D3 which limit the pulse waveform which appears at the gate of transistor Q1 of switch circuit 11 to between −1 and +10 volts relative to its source leads; and resistor R3 which loads the gate of transistor Q1 of switch circuit 11 keeping gate leakage current from turning it on unintentionally when no drive pulses are present. Switch circuit 11 also comprises ultrafast switching diode D4. During normal operation, whenever transistor Q1 is not turned on, diode D4 supplies current to inductor L2 of output filter circuit 13 which has sufficient inductance to maintain its current within about 300 milliamps of the output load current of the output filter circuit 13.

Output filter circuit 13 comprises resistor R5 and capacitor C7 which form a "snubber" network to limit RFI due to the high switching rate of transistor Q1 and diode D4 of switch circuit 11 and it also comprises inductors L2 and L6 and capacitors C8 and C9 which filter the high frequency pulse waveform to low ripple DC. Inductor L5 and capacitor C18 of output filter circuit 13 filter RF noise from the output.

Inductor L2 is bifilar wound. Its two windings are connected in parallel to minimize DC resistance, thereby reducing power dissipation and increasing the AC to DC conversion efficiency of the power supply.

The crowbar circuit 15 is comprised of zener diode D9, resistor R17, capacitor C16 and SCR Q4. zener diode D9 begins conducting when the output voltage reaches a set level, causing SCR Q4 to turn on. Resistor R17 negates the effect of leakage currents in SCR Q4 and zener diode D9 and capacitor C16 keep noise from triggering the crowbar circuit 15. Since transistor Q4 will remain on as long as current flows through it, integrated circuit U1 senses the output voltage through diode D5 of control circuit 7 and shuts down operation of the supply when the voltage drops below a set level causing the output current to cease and SCR Q4 to reset. Note the shut-down operation will take place anytime the output voltage drops below a set level whether because of crowbar operation, a short circuited output or insufficient input voltage. Once integrated circuit U1 has shut down operation, its current consumption drops from about 15 milliamps to less than 1 milliamp and capacitor C10 can then begin charging through resistor R7 and diode D6 as in a normal start up. Depending on input voltage this can take anywhere from a tenth of a second to a few seconds. Whenever integrated circuit U1 is in operation, current through transistor Q1 is limited to about 3.5 amps by current sensor circuit 5. However, if the DC load is excessive, for instance if the output is short circuited, integrated circuit U1 will only operate in short pulses. This is a desirable characteristic as it limits power dissipation during overload conditions, simplifies design of the crowbar means 15 and can assist in overcoming the overload condition.

Figure 3C:
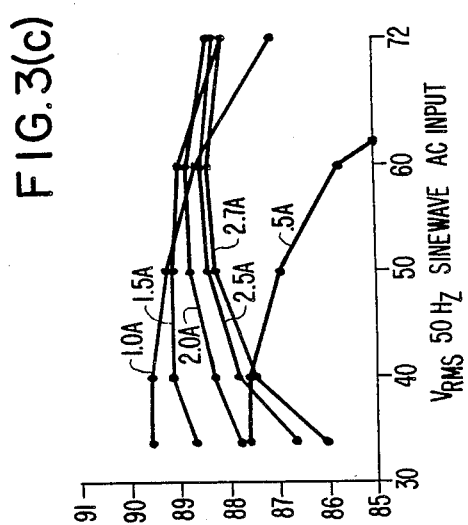
FIG. 3 are graphs showing conversion efficiency for embodiments of the instant invention with different A.C. inputs.
Figure 3A:
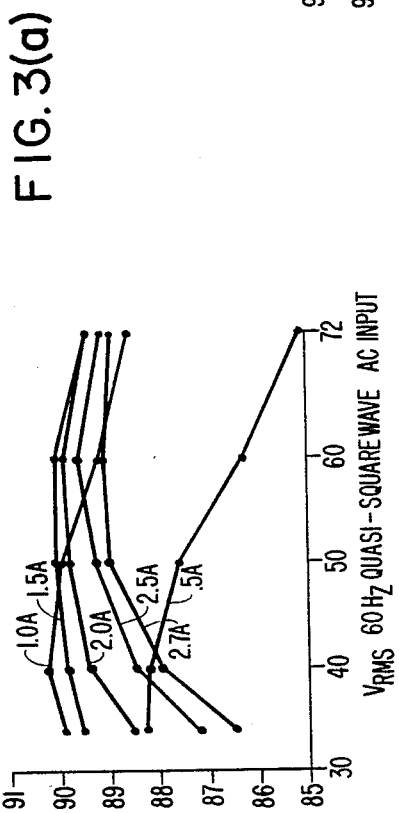
Figure 3B:
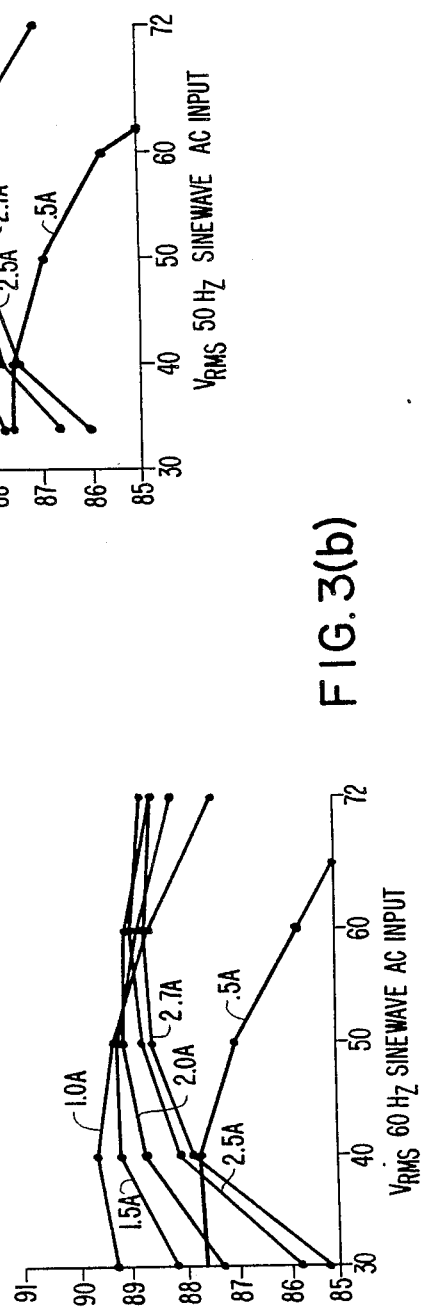

FIG. 3(a)-3(c) are graphs showing examples of efficiencies obtained with the instant invention having 60 Hz. Quasi-squareware, 60 Hz sinewave and 50 Hz sinewave inputs respectively at different current levels.

Component values are not critical to the invention and are selected based upon the desired input and output ratings of the power supply. Transformer T2 should possess a low leakage inductance and a high saturation flux density. Its turns ratio is a function of power supply output voltage and the value of diode D3.

Lower performance embodiments of the invention can be constructed which still exceed 85% efficiency, for example, relay K1 can be substituted or deleted, and inductor L2 can be replaced with a non-bifilar wound component. The invention includes embodiments which can be constructed without the unique drive circuit or input control circuit, however efficiency is lower as a result. Other switched mode PWM controllers may also be used.

Although specific embodiments of the invention have been shown and described herein it will be understood that various modifications may be made without departing from the spirit of this invention.

I claim:

1. A direct coupled switched mode power supply comprising:
    (a) an input for receiving an alternating current;
    (b) rectifying means coupled to said input for converting said alternating current to a direct current;
    (c) an output for supplying the direct current at a regulated output voltage;
    (d) switch means for controlling the flow of direct current between said rectifying means and said output;
    (e) output control means, for regulating said output voltage by providing a switching pulse signal at a variable duty cycle of greater than 50% to said switch means;
    (f) driver means for coupling said switch means to said output control means, said driver means comprising a pulse transformer; and
    an output filter means coupled to said switch means, said output filter means comprising a bifilar wound inductor.

2. The switched mode power supply of claim 1 wherein said pulse transformer has a low leakage inductance and a high saturation flux density to provide stable operation over a wide duty cycle range.

3. The power supply of claim 1 further comprising an input control means coupled to said input for controlling the flow of said alternating current to said rectifying means, said input control means comprising surge limiting means for limiting current flow during initial power application, and shunt means for bypassing said surge means during normal operation of the power supply thereby reducing power dissipation and increasing efficiency.

* * * * *